(12) United States Patent
Kearns et al.

(10) Patent No.: US 8,516,477 B1
(45) Date of Patent: Aug. 20, 2013

(54) AUTOMATED DEPLOYMENT TOOL FOR MULTIPLE SERVER ENVIRONMENT

(75) Inventors: James E. Kearns, Lincoln Park, NJ (US); Venkat Gaddam, Bridgewater, NJ (US); Dharmaveera Veerabhadraiah, Dayton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 624 days.

(21) Appl. No.: 12/723,288

(22) Filed: Mar. 12, 2010

(51) Int. Cl.
*G06F 9/445* (2006.01)

(52) U.S. Cl.
USPC .......................................... 717/176; 717/174

(58) Field of Classification Search
USPC .................................. 717/176, 174
See application file for complete search history.

(56) References Cited

U.S. PATENT DOCUMENTS

| | | | | |
|---|---|---|---|---|
| 7,519,964 | B1 * | 4/2009 | Islam et al. | 717/177 |
| 7,861,243 | B2 * | 12/2010 | Narayanaswamy et al. | 717/177 |
| 2002/0004824 | A1 * | 1/2002 | Cuan et al. | 709/208 |
| 2010/0251247 | A1 * | 9/2010 | Pedersen | 718/102 |

\* cited by examiner

*Primary Examiner* — Li B Zhen
*Assistant Examiner* — Hui-Wen Lin

(57) ABSTRACT

A method is described for deploying a software application to run on each server in a group of servers configured to provide a service based on the software application. A dashboard, as a unified user interface for all of the servers of the group, is presented on a user terminal device. One or more user inputs via the dashboard automatically initiate parallel processing with respect to all of the servers of the group. The automate processing include: (i) backing up current server application code for the service, for each of the servers of the group; (ii) installing a new server application code file, for the software application, in each of the servers of the group; and (iii) restarting each server to implement the service by running the software application from the new server application code file.

13 Claims, 4 Drawing Sheets

AUTOMATED DEPLOYMENT TOOL FOR MULTIPLE SERVER ENVIRONMENT

TECHNICAL FIELD

The present subject matter relates to techniques and equipments for automating deployment of software applications for multiple server environment.

BACKGROUND

Many different enterprises run complex networks of servers to implement various automated communication functions to the enterprise. For example, as mobile wireless communications have become increasingly popular, carriers such as Verizon Wireless™ have customer communication systems to provide notifications of account related activities to their customers, for example, as Short Message Service ("SMS") messages to account holders' mobile stations, as emails, etc. Because of the large number of customers served by a major carrier, and the level of account activities, the volume of notification message traffic is quite large. To effectively provide such notifications, Verizon Wireless™ implemented its Customer Communication Enterprise Services ("CCES") as an enterprise middleware web service.

At a high level, the CCES middleware comprises a web server layer and an application layer. The architecture allows clients to send a request, for example for a notification, to a web server. The http web server then forwards the client request to one of a number of application servers. Each application server has multiple applications running on it. The application server determines the proper application to process the client request based on the context root of the client request. The application server processes the client request, in the CCES example, by sending one or more request messages to a back end system such as the Vision Billing System, Mobile Telephone Activation System ("MTAS"), the SMS gateway and others, for example, to implement account activity and to initiate subsequent automatic notification thereof to the account holder. Once the application server has processed the request, a reply is then sent back to the web server which will then forward the reply back to the client.

In a multiple server environment described above, there are many servers running many applications that perform a variety of functions. These applications may require constant updating and modifications. The updates may be done on scheduled basis once a week, for example. The process of updating these applications with new code/configuration may generally be the same from week to week with subtle but important differences. This process is called a "Change Control" at, for example, Verizon Wireless™. At Verizon Wireless™ there are about seven groups of servers, which may run the same applications, for implementing the CCES functionality. Each group of server may have anywhere from eight to sixteen physical machines. There are four steps to the current software "Change Control" process.

The first step in installing new or updated server software includes installing updated application code. In this step, an updated version of the application code is to be deployed on the servers in the group. This is involves: (a) taking down the affected servers running the file to be updated, (b) backing up current server application code, (c) installing the new An Enterprise ARchive ("EAR") file, (d) restarting the server (e.g., each machine has its own GUI to do this process), and (e) notifying the testers to begin once the server application is back on line. The EAR is a file format used for packaging one or more modules into a single archive so that the deployment of the various modules onto an application server happens simultaneously and coherently.

The second step includes installing updated application configuration files. In about 70% of the update deployments several files may need to be deployed/updated. These are supporting application configuration files or simply files that customers may download depending on the application being used by the customer. The process to accomplish this is by copying files to some/all of the machines in the group.

The third step includes executing Structured Query Language ("SQL") files. After performing the first and second steps, the SQL may need to be executed. This may be done once and may not be per machine type process. The deployer may be given some SQL files and may run them against three different Oracle tables. These may be run on one central Graphical User Interface ("GUI").

The fourth step includes running of scripts. In some of the server groups, scripts may need to be run at various points within the deployment process. These scripts are small programs that need to be run at specific points/steps within the process to perform functions that aid in the deployment.

The steps in the above process are manual and require the deployer to log onto individual machines in the server group to perform the steps sequentially. That is, deploying two to three groups of servers would involve manually logging into twenty-four machines and running multiple process steps on each. This requires more than one person because one person cannot keep up with all the tasks that are occurring simultaneously. Therefore, there is a need to improve on the time-consuming repetitive tasks requiring two or more human resources to perform the four step deployment process described above, for example, on as many as twenty-four machines.

SUMMARY

In one general example, the instant application describes a method of deploying a software application to run on each server in a group of servers configured to provide a service based on the software application. The method includes steps of presenting a dashboard as a unified user interface for all of the servers of the group, on a user terminal device; and in response to one or more user inputs via the dashboard, automatically initiating parallel processing with respect to all of the servers of the group for: (i) backing up current server application code for the service, for each of the servers of the group; (ii) installing a new server application code file, for the software application, in each of the servers of the group; (iii) restarting each server to implement the service by running the software application from the new server application code file; and (iv) presenting notification installation is complete once each server application is back online, for service and/or testing.

The above general aspect may include one or more of the following features. For example, the method may further include steps of presenting a second instance of the dashboard as a unified user interface for all servers of another group, on the user terminal device; and in response to one or more user inputs via the second instance of the dashboard, automatically initiating parallel processing with respect to all of the servers to the other group for: (i) backing up current server application code for the service, for each of the servers of the other group; (ii) installing another new server application code file, for a software application of the other group of servers, in each of the servers of the group; (iii) restarting each server of the other group to implement the service by running the software application of the other group from the other new server application code file; and (iv) presenting notification installation is complete once each server application of the other group is back online, for service and/or testing.

The first group of servers may be servers for Customer Communication Enterprise Services ("CCES") and the second group of servers may be mobile station application servers. The new application code file may be an Enterprise ARchive ("EAR") file. The method may further include a step of automatically installing, in response to one or more user inputs via the dashboard, in each of the servers of the group configuration/deployment files associated with the new server application code file. The method may further include a step of automatically running, in response to one or more user inputs via the dashboard, Structured Query Language ("SQL") files against Oracle tables in one or more of the servers of the group. The method may further include a step of automatically running, in response to one or more user inputs via the dashboard, scripts during the deployment steps (i)-(iii) above to aid the deployment of the software application in one or more of the servers of the group.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
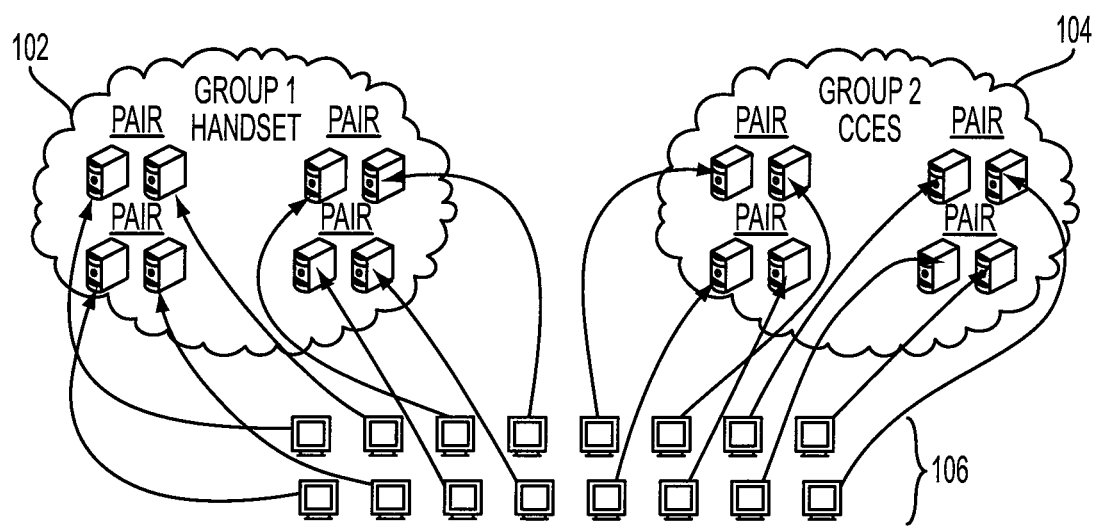
FIG. 1 illustrates an exemplary system diagram configured to handle the deployment process described in the background of the instant application.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described below enable as few as one technical support person to perform the deployment process of the applications in a multi server environment. Specifically, the examples involve creating one unified dashboard that runs/controls/displays in detail the four step processes described above but simultaneously in parallel for all the machines in the groups. The dashboard may be presented as a unified user interface for all of the servers of a particular group, on a user terminal device. The user terminal may include one of the computers at the mobile service provider connected to the servers within the group. In response to one or more user inputs via the dashboard, concurrent parallel processing with respect to all of the servers of the group may be automatically initiated for: (i) backing up current server application code for the service, for each of the servers of the group; (ii) installing a new server application code file, for the software application, in each of the servers of the group; (iii) restarting each server to implement the service by running the software application from the new server application code file; and (iv) presenting notification installation is complete once each server application is back online, for service and/or testing.

In one example, the dashboard includes a top tier, a middle tier, and a bottom tier. This is described in more detail with respect to FIG. 3. The top tier stages the new EAR files and supporting applications once they have been copied to a database using the bottom tier. In one specific example, the top tier contains buttons that actually deploy the new EAR files once they have been staged on the user terminal. To this end, each server may include a deployment button that results in the deployment of the new EAR files associated with that server. In one implementation, the user may sequentially select the deployment button for each of the servers that includes a new EAR file which results in substantially simultaneous deployment of the new EAR files for the servers. The deployment of a particular new EAR file for the server involves stopping the target application server, taking a backup of the current EAR file, getting a time stamp of the current EAR file, then overwriting the old EAR file with the new EAR file and starting the application server. This process may be automatically repeated for the remaining new EAR files.

The middle tier provides a detailed status displays per machine. It shows what is going on in the four step process on each machine (e.g., letting you know how the deployment is going and what step in that deployment you are currently at). The bottom tier contains three groupings of buttons.

The first grouping relates to a file selection box that enables the user to choose the new EAR files. For each new EAR file, the dashboard may need one click deployment per each server which also provides a status displaying all of the sub steps in the EAR deployment process, also alerting if something goes wrong. The second grouping relates to the configuration/deployment file selection box that enables the user to choose the supporting application configuration files associated with the new EAR files. The third grouping relates to a button for running the SQL files. The SQL files may be located on the computer on which the dashboard is being operated and may run automatically on several databases. The databases may be at different servers of the mobile service provider. Since the scripts that might need running are already located on the servers, a click of a button on the dashboard can initiate the process that will automatically log into the machine and run the script, while displaying the output of the script on the dashboard.

Reference now is made in detail to the examples illustrated in the accompanying drawings and discussed below. FIG. 1 illustrates an exemplary system diagram configured to handle the deployment process described in the background of the instant application. As shown, there are two groups of servers 102, 104. The first group of servers 102 include mobile station application servers and the second group of servers 104 include CCES servers. One of ordinary skill in the art recognizes that these are exemplary groups of server and the instant application is not limited to the deployment process for only these two groups of servers and can apply to other group of servers as well. Additionally, although eight servers is shown in each group of servers, the group of servers may have more or less number of servers.

The mobile station application servers enable the basic functionality of mobile devices such as, for example, locating mobile devices and routing phone calls. The CCES servers as described above in the background enable notifications of account related activities to the customers of the mobile service providers, for example as SMS messages to account holders' mobile stations, as emails, etc. To deploy software application to run on each server within each group, in one implementation the deployer may have to manually log into sixteen machines, collectively shown as user terminals 106, and run commands on GUI to complete the four steps described above. The user terminals 106 provides an interface to each of the servers.

Figure 2:
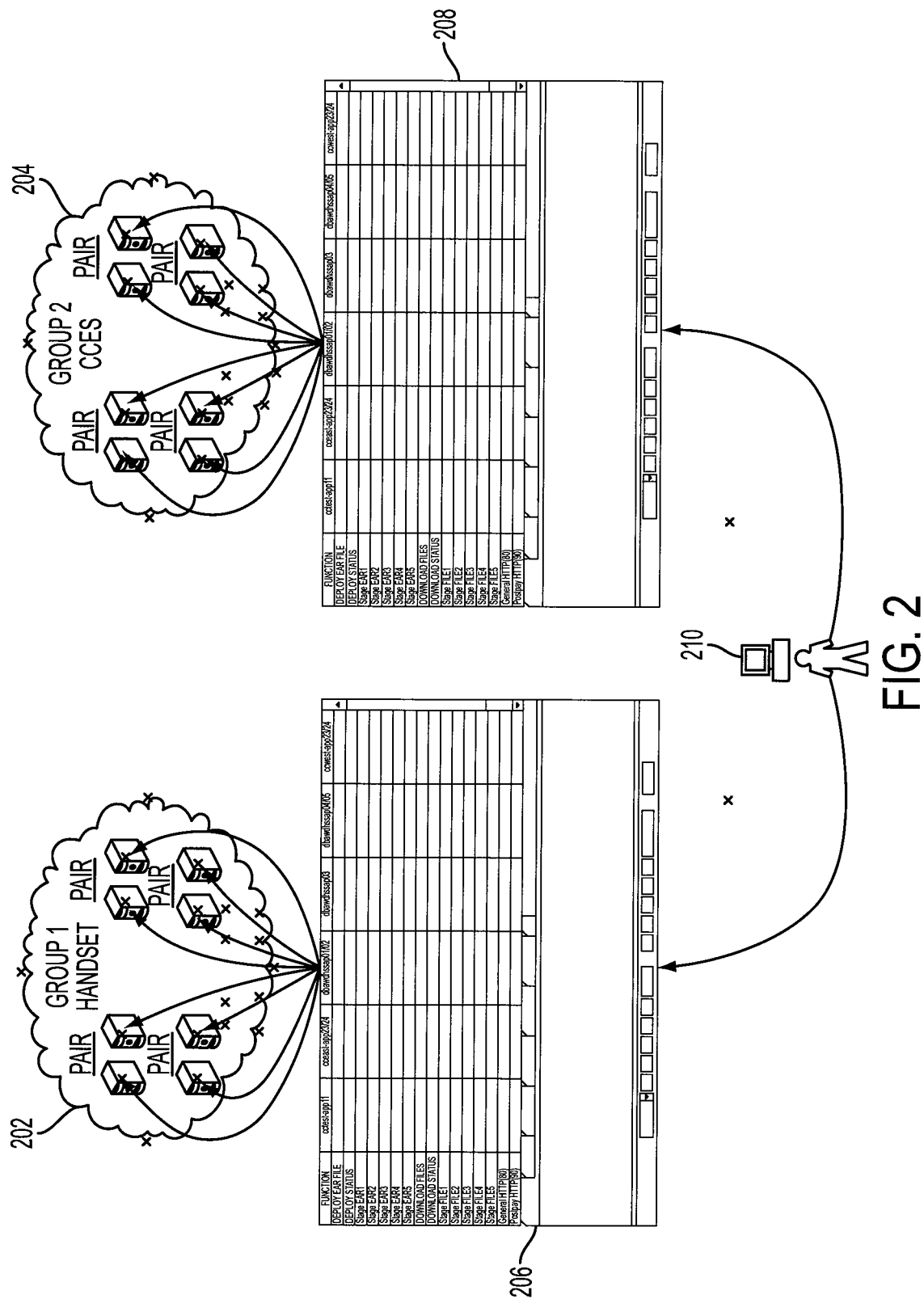
FIG. 2 illustrates an exemplary system diagram configured to handle the automatic deployment process.

FIG. 2 illustrates an exemplary system diagram configured to handle the automatic deployment process. Similar to FIG. 1, FIG. 2 includes two groups of servers 202, 204. The first group of servers 202 are mobile station application servers and the second group of servers 204 are CCES servers. In contrast to FIG. 1, in FIG. 2 details of the multiple logons and steps have been hidden from the deployer and replaced with a single dashboard 206, 208 for each server group. The multiple login may be replaced with a single login which automatically logs the user into all the sixteen servers. Instead of juggling between a total of sixteen consoles, there are just two dashboards 206, 208, which may be presented on a user terminal 210. The dashboards 206, 208 enable staging and deploying the new EARs for each of the servers in the groups 202, 204. The user terminal 210 includes a computer at the mobile service provider and provides an interface to the servers within each group 202, 204.

All of the four processing steps are clickable buttons and file selection boxes. Each box is represented with a status screen as well to show how the process is going. All the updates can occur between the dashboards and the sixteen servers. The sixteen servers may have software application code on them that perform as a client. These clients perform the work that the user requests via the dashboard in parallel if required.

To illustrate, the dashboards 206, 208 may represent GUIs for each of the first and second server groups on a user terminal device the user is operating. If the user wishes to update software applications on the first group 202, the user uses the dashboard 206. If the user wishes to update software applications on the second group 204, the user uses the dashboard 208. Assuming that the user wishes to update software applications on the first group 202, the user inputs one or more commands via the dashboard 206. The one or more commands may automatically initiate parallel processing with respect to some or all servers within the first group 202 for (i) backing up current server application code for the service, for the servers of the first group 202; (ii) installing a new server application code file, for the software application, in the servers of the first group 202; (iii) restarting each server to implement the service by running the software application from the new server application code file; and (iv) presenting notification installation is complete once each server application is back online, for service and/or testing.

If the user now wishes to update a software application on the second group 204, the user inputs one or more commands via the dashboard 208, which may automatically initiate parallel processing with respect to some or all of the servers to the second group 204 for: (i) backing up current server application code for the service, for the servers of the second group 204; (ii) installing another new server application code file, for a software application of the second group 204, in the servers of the second group 204; (iii) restarting each server of the other group to implement the service by running the software application of the second group 204 from the other new server application code file; and (iv) presenting notification installation is complete once each server application of the other group is back online, for service and/or testing.

Figure 3:
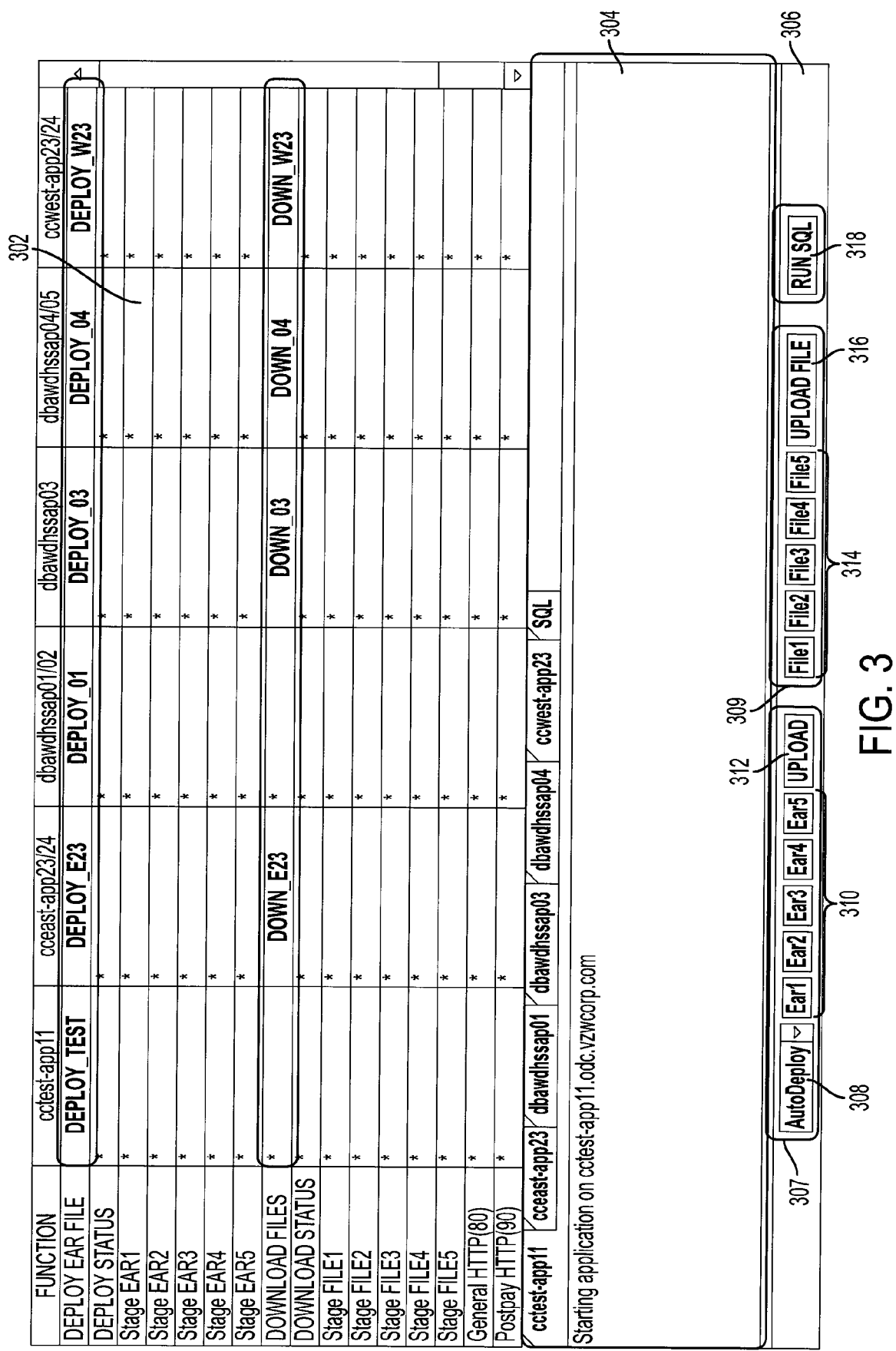
FIG. 3 illustrates an exemplary automated deployment tool dashboard.

FIG. 3 illustrates an exemplary automated deployment tool dashboard. The dashboard 300 includes a top tier 302, a middle tier 304, and a bottom tier 306. The top tier 302 contains buttons that actually deploy the new EAR file once they have been staged on the machine via the bottom tier 306 as described below. This involves stopping the target application server, taking a backup of the old EAR file for insuring update is completed successfully, getting a time stamp of the old EAR file, then overwriting the old EAR file with the new EAR file and starting the application server to run using the new EAR file. As shown, there are also status fields that show what applications are being loaded to the servers denoted by "cctest-app11", "cceast-app23/24" etc. There is a button (e.g., "DEPLOY_TEST") for every server to deploy the new EAR file to that server and its corresponding pair, to move the supporting files to there proper location, and also (not shown) buttons to display the log of any file deployed. Once the deployment test is selected for each server, the deployment process (i)-(iv) for that server beings to run. Similarly, the deployment process for the remaining servers initiate such that the deployment process for the plurality of servers are substantially simultaneous. For example, each of the steps (i)-(iv) may run in parallel for each of the servers.

The middle tier 304 provides a detailed status displays per server. It shows what is going on in the four step process on each server (e.g., letting you know how the deployment is going and what step in that deployment you are currently at). Alternatively to monitor the entire deployment process, the top tier 302 includes a "Deploy Status" button under the "Deploy Test" button which gives an eleven step color coded overview of the entire process.

The bottom tier 306 contains three groupings of buttons: EAR staging buttons 307, client download file staging buttons 309, and a SQL button 318. The EAR staging buttons 307 enable staging of the new EAR files to all the servers that the particular new EAR file (application) will run on. For example, these are the buttons that enable copying of EAR files to an Oracle database. The Oracle database may be a database on a particular server and may store selected EAR and applications files. Once the EAR files are stored in the Oracle database and staged on the top tier 302, the dashboard can run a script that can automatically (i) back up the old EAR file of the servers; (ii) install the new EAR file to a staging directory of the relevant servers; (iii) restart the servers to implement the service by using the new EAR file; and (iv) present notification that installation is complete once each server is back online, for service and/or testing.

To illustrate, in one implementation, the dashboard may contain a deployment button (e.g., "DEPLOY_TEST") for each server selection of which results in the deployment of the new EAR files associated with that server once they have been staged on the user terminal. The deployment of a particular new EAR file for the server involves automatically stopping the target application server, taking a backup of the current EAR, getting a time stamp of the old file, then overwriting the old EAR file with the new EAR file and starting the application server. The deployment process may automatically continue until all the new EAR files for the server have been successfully installed. The user may sequentially select the deployment button for each of the servers that includes a new EAR file which results in substantially simultaneous deployment of the new EAR files for the servers.

In another implementation, the dashboard may contain a deployment button, activation of which results in deployment of the new EAR file for all the servers that run a particular application requiring the new EAR file. In this scenario, the deployment of the new EAR file involves automatically stopping the target application servers, taking a backup of the current EAR file of the target application servers, getting a time stamp of the old file, then overwriting the old EAR file with the new EAR file and starting the application server. This process may be repeated until all the new EAR files have been installed. The above-described deployment button may be included in the top tier, the middle tier, or the bottom tier. For example, the deployment button may be the upload button 312 for the new EAR files and the upload file button 316 for the program files. In keeping with the previous example, the selection of the upload button 312 may result in deployment of the new EAR file for all the servers that run a particular application requiring the new EAR file. The deployment process may automatically continue until all the new EAR files have been installed on all the corresponding servers.

The process for staging the EAR files may include the followings. The user selects a software application from the application drop down menu 308 for which the EAR file has to be updated and then the user picks an EAR via the EAR buttons 310. For example, the user may click on EAR1 to find the particular EAR associated with the selected application and select it. The user can repeat this process for other EARs (e.g., EAR1-5). Once the user has selected all the EARs associated with the software application, the user may select the upload button 312 to stage the EARs to the Oracle database. This will automatically result in populating the top tier 302 for the servers that run that particular software application. For example, selected EAR1 may appear in row "Stage EAR1" for all the servers that run this particular application. After the database load is complete, as noted above in one implementation, the dashboard will automatically copy to all the servers and run a script that will download all the EARs from the Oracle database and stage them to a fixed directory.

The bottom tier 306 also includes the client download file staging buttons 309. The client download file staging buttons 309 enable staging of the download files to all the servers. The process is similar to downloading the EAR files except the following. Each of the drop-down file selectors (total of 5 in this example) enables the user to pick multiple download files. The user may select all the files in the directory that the user wants to put to the servers download directory. Once all the download files are selected, the user may use the upload file button 316 to stage the download files to the top tier 302. This will automatically result in populating the top tier 302 for the servers that require the particular download files. For example, selected File1 may appear in row "Stage File1" for all the servers that require this file for their application. After the database load is complete, the dashboard will automatically copy to all the servers and run a script that will download all the files from the database and stage them to a fixed directory.

The dashboard 300 also includes a button 318 for running the SQL files. The SQL files may be located on the computer on which the dashboard 300 is being presented and may run automatically on several databases. The databases may be located in various servers associated with the mobile service provider. Since the scripts that might need running are already located on the servers, a button click can initiate the process that will automatically log into the machine and run the script, while displaying the output of the script on the dashboard. To illustrate, the user may manually stage all the SQL preload files into one directory. The user then clicks on the button 318. This will bring up a file chooser menu, enabling the user to go to the directory where the user has staged all the preload files and select the preload files. This will then run all of the SQL files on the several databases. The user may click on the SQL tab to see the progress of the run.

As shown by the above discussion, functions relating to the techniques for automating deployment process of the applications in a multi server environment may be implemented on computers connected for data communication via the components of a packet data network, operating user terminals 106, 210 shown in FIGS. 1 and 2. Although special purpose devices may be used, such devices also may be implemented using one or more hardware platforms intended to represent a general class of data processing device commonly used to run "user terminal" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the automation of the deployment of the applications in a multi server environment. The software code is executable by the general-purpose computer that functions as the deploying terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for automating deployment process of the applications in a multi server environment, in essentially the manner performed in the implementations discussed and illustrated herein.

Figure 4:
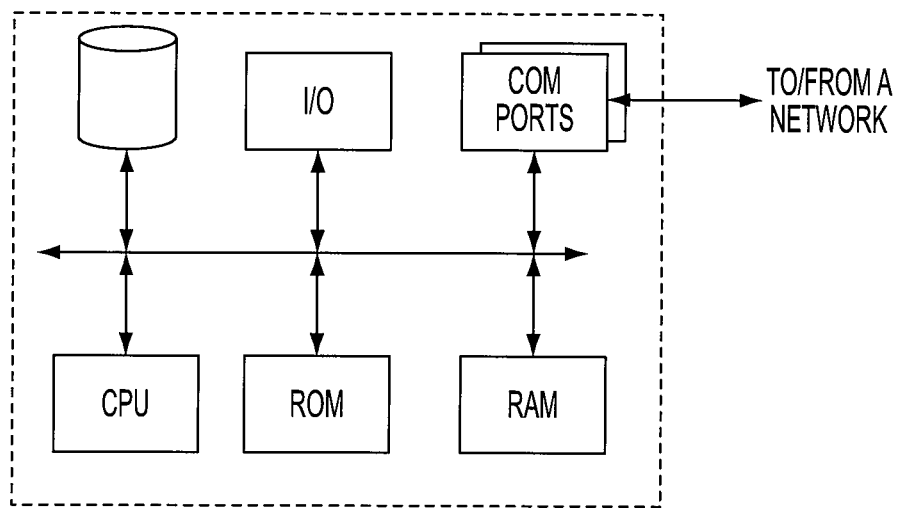
FIG. 4 is a simplified functional block diagram of a computer that may be configured as a host or server, for example, to function as one of the servers in the system of FIG. 1.
Figure 5:
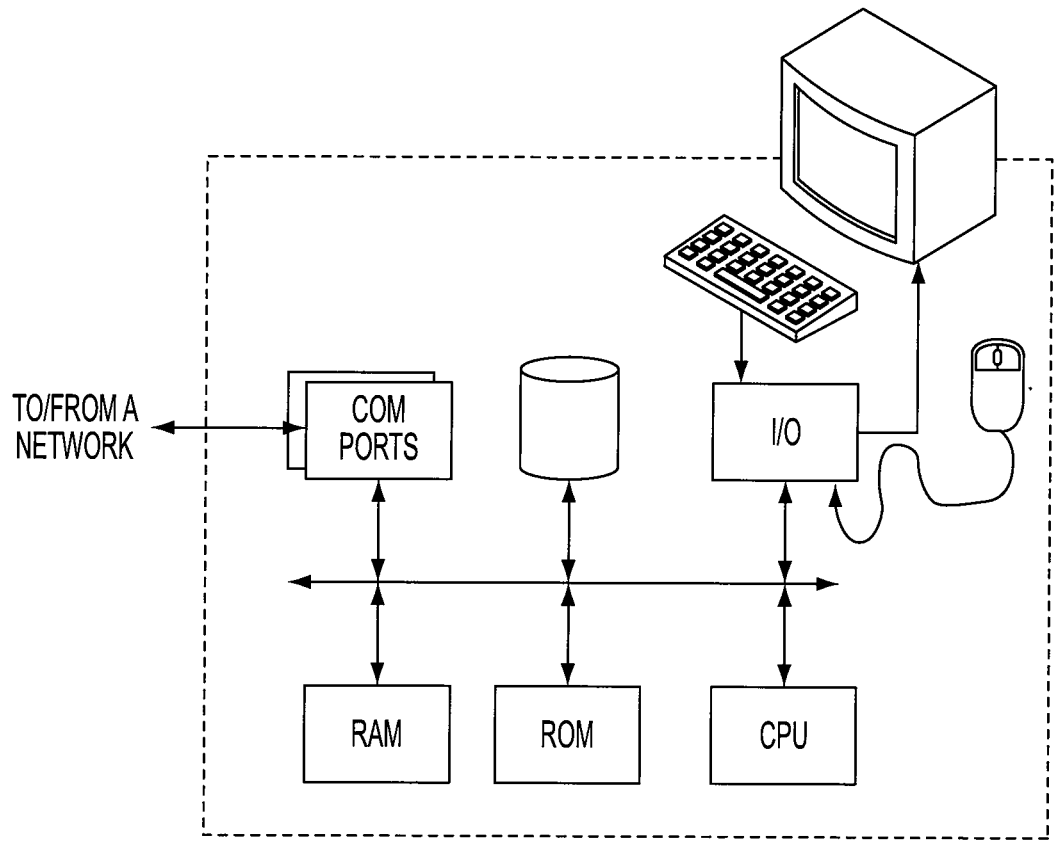
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a user terminal or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Similarly, a user terminal includes a data communication interface for packet data communication. The user terminal also includes a CPU, in the form of one or more processors, for executing program instructions. The user terminal platform typically includes an internal communication bus, program storage and data storage for various data files to be processed and/or communicated by the user terminal. The hardware elements, operating systems and programming languages of such user terminal are conventional in nature, and it is presumed that those skilled in the art are adequately familiar therewith. Of course, the user terminal functions may be implemented in a distributed fashion on a number of similar platforms, to distribute the processing load.

Hence, aspects of the methods of deploying a software application to run on each server in a group of servers configured to provide a service based on the software application outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the user terminal hosting the dashboard. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the dashboard, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of deploying a software application to run on each server in first and second groups of servers configured to provide a service based on the software application, comprising steps of:
   presenting a first instance of a dashboard as a unified user interface for all of the servers of the first group, on a user terminal device;
   in response to one or more user inputs via the first instance of the dashboard, automatically initiating parallel processing with respect to all of the servers of the first group for:
   (i) backing up current server application code for the service, for each of the servers of the first group;
   (ii) installing a first new server application code file, for the software application, in each of the servers of the first group;
   (iii) restarting each server to implement the service by running the software application from the first new server application code file; and
   (iv) presenting notification installation is complete once each server application is back online, for service and/or testing;
   wherein the first instance of the dashboard includes a first section, a second section, and a third section in which:
   the first section includes identification of each of a plurality of application servers and a corresponding selectable item for allowing deployment of new files,
   the second section is configured to provide deployment status for each of the identified application servers, the deployment status identifying status of the processing (i), (ii), (iii), or (iv), and
   the third section includes a staging icon for staging the new files in the first section,
   presenting a second instance of the dashboard as a unified user interface for all servers of the second group, on the user terminal device; and
   in response to one or more user inputs via the second instance of the dashboard, automatically initiating parallel processing with respect to all of the servers to the second group for:
   (i) backing up current server application code for the service, for each of the servers of the second group;
   (ii) installing a second new server application code file, for a software application of the second group of servers, in each of the servers of the second group;
   (iii) restarting each server of the second group to implement the service by running the software application of the second group from the second server application code file; and
   (iv) presenting notification installation is complete once each server application of the second group is back online, for service and/or testing.

2. The method of claim 1, wherein:
   first group of servers are Customer Communication Enterprise ("CCES"), second group of servers are mobile station application servers.

3. The method of claim 1, wherein the first new application code file is an Enterprise ARchive ("EAR") file.

4. The method of claim 1, further comprising, in response to one or more user inputs via the first instance of the dashboard, automatically installing in each of the servers of the first group configuration/deployment files associated with the first new server application code file.

5. The method of claim 1, further comprising, in response to one or more user inputs via the first instance of the dashboard, automatically running Structured Query Language ("SQL") files against Oracle tables in one or more of the servers of the first group.

6. The method of claim 1, further comprising, in response to one or more user inputs via the first instance of the dashboard, automatically running scripts during the steps (i)-(iii) to aid the deployment of the software application in one or more of the servers of the first group.

7. A system for deploying a software application to run on each server in first and second groups of servers configured to provide a service based on the software application, comprising:
an interface for network communication with the servers of the group;
a programmable processor;
a program storage accessible by the processor, wherein programming in the storage:
implements a first instance of a software deployment dashboard as a unified user interface for all of the servers of the first group for presentation on a display terminal,
configures the processor so that the system has capabilities to, in response to one or more user inputs via the first instance of the dashboard, automatically initiate parallel processing with respect to all of the servers of the first group to:
  (i) back up current server application code for the service, for each of the servers of the first group;
  (ii) install a first new server application code file, for the software application, in each of the servers of the first group;
  (iii) restart each server to implement the service by running the software application from the first new server application code file; and
  (iv) present notification installation is complete once each server application is back online, for service and/or testing;
wherein the first instance of the dashboard includes a first section, a second section, and a third section in which:
  the first section includes identification of each of a plurality of application servers and a corresponding selectable item for allowing deployment of new files,
  the second section is configured to provide deployment status for each of the identified application servers, the deployment status identifying status of the processing (i), (ii), (iii), or (iv), and
  the third section includes a staging icon for staging the new files in the first section,
implements a second instance of a software deployment dashboard as a unified user interface for all of the servers of the second group for presentation on the display terminal; and
configures the processor so that the system has capabilities to, in response to one or more user inputs via the second instance of the dashboard, automatically initiate parallel processing with respect to all of the servers of the second group to:
  (i) back up current server application code for the service, for each of the servers of the second group;
  (ii) install a second new server application code file, for a software application of the second group of servers, in each of the servers of the second group;
  (iii) restart each server of the second group to implement the service by running the software application of the second group from the second new server application code file; and
  (iv) present notification installation is complete once each server application of the second group is back online, for service and/or testing.

8. The system of claim 7, wherein the first new application code file is an Enterprise ARchive ("EAR") file.

9. The system of claim 7, wherein the programming further configures the process to automatically install in each of the servers of the first group configuration/deployment files associated with the first new server application code file.

10. An article of manufacture, comprising:
a non-transitory machine readable storage medium; and
programming instructions embodied in said medium to configure a computer to have capabilities to:
present a first instance of a dashboard as a unified user interface for all of servers of a first group, on a user terminal device;
in response to one or more user inputs via the first instance of the dashboard, automatically initiate parallel processing with respect to all of the servers of the first group to:
  (i) back up current server application code for the service, for each of the servers of the first group;
  (ii) install a first new server application code file, for the software application, in each of the servers of the first group;
  (iii) restart each server to implement the service by running the software application from the first new server application code file; and
  (iv) present notification installation is complete once each server application is back online, for service and/or testing;
wherein the first instance of the dashboard includes a first section, a second section, and a third section in which:
  the first section includes identification of each of a plurality of application servers and a corresponding selectable item for allowing deployment of new files,
  the second section is configured to provide deployment status for each of the identified application servers, the deployment status identifying status of the processing (i), (ii), (iii), or (iv), and
  the third section includes a staging icon for staging the new files in the first section,
present a second instance of the dashboard as a unified user interface for all servers of a second group, on the user terminal device; and
in response to one or more user inputs via the second instance of the dashboard, automatically initiate parallel processing with respect to all of the servers to the second group to:
  (i) back up current server application code for the service, for each of the servers of the second group;
  (ii) install a second new server application code file, for a software application of the second group of servers, in each of the servers of the second group;
  (iii) restart each server of the second group to implement the service by running the software application of the second group from the second new server application code file; and (iv) present notification installation is complete once each server application of the second group is back online, for service and/or testing.

11. The article of manufacture of claim 10, wherein the programming instructions embodied in said medium further configure the computer to have capabilities to automatically install in each of the servers of the first group configuration/deployment files associated with the first new server application code file.

12. The article of manufacture of claim 10, wherein the programming instructions embodied in said medium further configure the computer to have capabilities to automatically run SQL files against Oracle tables in one or more of the servers of the first group.

13. The article of manufacture of claim 10, wherein the programming instructions embodied in said medium further configure the computer to have capabilities to automatically run scripts during the steps (i)-(iii) to aid the deployment of the software application in one or more of the servers of the first group.

\* \* \* \* \*